United States Patent
Barbu et al.

(10) Patent No.: US 11,751,014 B2
(45) Date of Patent: Sep. 5, 2023

(54) LONG TERM EVOLUTION (LTE) POSITIONING PROTOCOL (LPP) ENHANCEMENTS FOR LATENCY CONTROL

(71) Applicant: NOKIA TECHNOLOGIES OY, Espoo (FI)

(72) Inventors: Oana-Elena Barbu, Aalborg (DK); Diomidis Michalopoulos, Munich (DE); Ping-Heng Kuo, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 237 days.

(21) Appl. No.: 17/206,872

(22) Filed: Mar. 19, 2021

(65) Prior Publication Data
US 2022/0303725 A1 Sep. 22, 2022

(51) Int. Cl.
*H04W 4/029* (2018.01)
*G01S 5/02* (2010.01)

(52) U.S. Cl.
CPC .......... *H04W 4/029* (2018.02); *G01S 5/0273* (2013.01)

(58) Field of Classification Search
CPC ..... H04W 24/10; H04W 64/00; H04W 4/029; H04W 88/023; H04W 24/02; H04W 36/0077; H04W 36/0085; H04W 36/32; H04W 4/02; H04W 4/027; H04W 4/40; H04W 48/12; H04W 48/16; H04W 56/00; H04W 56/0015; H04W 64/003; H04W 72/0413; H04W 72/042; H04W 74/006; H04W 74/0833; H04W 76/14; H04W 8/005; H04W 84/12; H04W 88/02; H04W 92/18
USPC .......... 455/456.1, 450, 452.1, 456.5, 456.2, 455/550.1, 425, 436, 557, 522, 419, 566, 455/418, 67.11
See application file for complete search history.

(56) References Cited

U.S. PATENT DOCUMENTS

| | | | |
|---|---|---|---|
| 10,607,257 B2* | 3/2020 | Shaw | G06Q 30/00 |
| 2016/0337893 A1* | 11/2016 | Gheorghiu | H04W 24/10 |
| 2017/0176575 A1* | 6/2017 | Smits | G01S 7/4808 |
| 2018/0144682 A1* | 5/2018 | Tao | G09G 5/001 |
| 2018/0213425 A1* | 7/2018 | Huang | H04W 24/10 |
| 2020/0112867 A1* | 4/2020 | Opshaug | H04L 5/0051 |

(Continued)

FOREIGN PATENT DOCUMENTS

| | | |
|---|---|---|
| WO | 2016/187066 A1 | 11/2016 |
| WO | 2017/027066 A1 | 2/2017 |

OTHER PUBLICATIONS

Huawei, HiSilicon, "Discussion on R17 Positioning enhancement", R2-2006578, 3GPP TSG-RAN WG2 Meeting #111-e, Aug. 17, 2020.

(Continued)

*Primary Examiner* — Joseph Arevalo
(74) *Attorney, Agent, or Firm* — SQUIRE PATTON BOGGS (US) LLP (57) ABSTRACT

Systems, methods, apparatuses, and computer program products for positioning measurements are provided. One method may include receiving, from a user equipment, a number of supported receive and transmit panels that can be simultaneously activated and/or a panel switch time. The method may then include computing or otherwise determining a UE-based latency lag using the number of supported receiver and transmitter panels that can be simultaneously activated and the panel switch time.

18 Claims, 7 Drawing Sheets

(56) References Cited

U.S. PATENT DOCUMENTS

| | | | | |
|---|---|---|---|---|
| 2020/0228267 | A1* | 7/2020 | Park | H04B 7/0639 |
| 2020/0267685 | A1* | 8/2020 | Qi | H04W 4/027 |
| 2020/0336193 | A1* | 10/2020 | Park | H04B 7/0695 |
| 2021/0051559 | A1* | 2/2021 | Edge | H04W 8/12 |
| 2021/0266134 | A1* | 8/2021 | Axmon | H04L 5/0092 |
| 2021/0377825 | A1* | 12/2021 | Deenoo | H04W 48/12 |
| 2022/0038935 | A1* | 2/2022 | Xiong | H04L 5/0098 |
| 2022/0078650 | A1* | 3/2022 | Lee | H04W 72/0446 |
| 2022/0078670 | A1* | 3/2022 | Kung | H04W 36/04 |
| 2022/0086072 | A1* | 3/2022 | Chou | H04W 28/16 |
| 2022/0116837 | A1* | 4/2022 | Lee | H04W 36/0058 |
| 2022/0159640 | A1* | 5/2022 | Matsumura | H04B 7/0617 |
| 2022/0200675 | A1* | 6/2022 | Raghavan | H04B 7/063 |
| 2022/0225462 | A1* | 7/2022 | Manolakos | H04L 5/0051 |
| 2022/0256561 | A1* | 8/2022 | Kim | H04L 5/005 |
| 2022/0295300 | A1* | 9/2022 | Takada | H04W 72/046 |
| 2022/0326337 | A1* | 10/2022 | Zheng | H04W 64/00 |
| 2022/0345195 | A1* | 10/2022 | Jang | H04B 7/0404 |
| 2022/0369417 | A1* | 11/2022 | Park | H04W 24/08 |
| 2022/0386093 | A1* | 12/2022 | Baek | H04W 76/14 |
| 2022/0417889 | A1* | 12/2022 | Liberg | H04W 24/10 |

OTHER PUBLICATIONS

Qualcomm Incorporated, "New SID on NR Positioning Enhancements", RP-193237, 3GPP TSG RAN Meeting #86, Dec. 9, 2019.
3rd Generation Partnership Project; Technical Specification Group Radio Access Network; NR; Radio Resource Control (RRC) protocol specification (Release 16), 3GPP TS 38.331, V16.3.0, Dec. 2020.
3rd Generation Partnership Project; Technical Specification Group Radio Access Network; NR; Requirements for support of radio resource management (Release 16), 3GPP TS 38.133, V16.6.0, Dec. 2020.

* cited by examiner

Fig. 1

```
-- ASN1START

OTDOA-ProvideCapabilities ::= SEQUENCE {
    otdoa-Mode    BIT STRING {   ue-assisted           (0),
                                 ue-assisted-NB-r14    (1),
                                 ue-assisted-NB-TDD-r15  (2) } (SIZE (1..8)),
    ...,
    supportedBandListEUTRA     SEQUENCE (SIZE (1..maxBands)) OF SupportedBandEUTRA    OPTIONAL,
    supportedBandListEUTRA-v9a0 SEQUENCE (SIZE (1..maxBands)) OF SupportedBandEUTRA-v9a0
                                                                              OPTIONAL,
    interFreqRSTDmeasurement-r10        ENUMERATED { supported }              OPTIONAL,
    additionalNeighbourCellInfoList-r10 ENUMERATED { supported }              OPTIONAL,
    prs-id-r14                          ENUMERATED { supported }              OPTIONAL,
    tp-separation-via-muting-r14        ENUMERATED { supported }              OPTIONAL,
    additional-prs-config-r14           ENUMERATED { supported }              OPTIONAL,
    prs-based-tbs-r14                   ENUMERATED { supported }              OPTIONAL,
    additionalPathsReport-r14           ENUMERATED { supported }              OPTIONAL,
    densePrsConfig-r14                  ENUMERATED { supported }              OPTIONAL,
    maxSupportedPrsBandwidth-r14        ENUMERATED { n6, n15, n25, n50, n75, n100, ...} OPTIONAL,
    prsOccGroup-r14                     ENUMERATED { supported }              OPTIONAL,
    prsFrequencyHopping-r14             ENUMERATED { supported }              OPTIONAL,
    maxSupportedPrsConfigs-r14          ENUMERATED { c2, c3 }                 OPTIONAL,
    periodicalReporting-r14             ENUMERATED { supported }              OPTIONAL,
    multiPrbNprs-r14                    ENUMERATED { supported }              OPTIONAL,
    idleStateForMeasurements-r14        ENUMERATED { required }               OPTIONAL,
    numberOfRXantennas-r14              ENUMERATED { rx1, ... }               OPTIONAL,
    motionMeasurements-r15              ENUMERATED { supported }              OPTIONAL,
    interRAT-RSTDmeasurement-r15        ENUMERATED { supported }              OPTIONAL maxsupportedSimultaneousTxRxantennas-r17 ENUMERATED { supported }         OPTIONAL antennaSwitchTime-r17          ENUMERATED { supported }                   OPTIONAL

} maxBands INTEGER ::= 64

SupportedBandEUTRA ::= SEQUENCE {
    bandEUTRA                       INTEGER (1..maxFBI)
}

SupportedBandEUTRA-v9a0 ::=     SEQUENCE {
    bandEUTRA-v9a0                  INTEGER (maxFBI-Plus1..maxFBI2)    OPTIONAL
} maxFBI                       INTEGER ::= 64  -- Maximum value of frequency band indicator
maxFBI-Plus1                 INTEGER ::= 65  -- lowest value extended FBI range
maxFBI2                      INTEGER ::= 256 -- highest value extended FBI range

-- ASN1STOP
```

205 → maxsupportedSimultaneousTxRxantennas-r17
210 → antennaSwitchTime-r17

LONG TERM EVOLUTION (LTE) POSITIONING PROTOCOL (LPP) ENHANCEMENTS FOR LATENCY CONTROL

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to positioning in such systems, such as positioning in 5G.

BACKGROUND

Examples of mobile or wireless telecommunication systems may include the Universal Mobile Telecommunications System (UNITS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment is directed to a method, which may include receiving, from a user equipment, at least one of a number of supported receive and transmit panels that can be simultaneously activated and a panel switch time, and computing a UE-based latency lag using the number of supported receiver and transmitter panels that can be simultaneously activated and the panel switch time.

An embodiment is directed to an apparatus including at least one processor and at least one memory comprising computer program code. The at least one memory and computer program code are configured, with the at least one processor, to cause the apparatus at least to receive, from a user equipment, at least one of a number of supported receive and transmit panels that can be simultaneously activated and a panel switch time, and to compute a UE-based latency lag using the number of supported receiver and transmitter panels that can be simultaneously activated and the panel switch time.

An embodiment may be directed to non-transitory computer readable medium comprising program instructions stored thereon for performing at least the following: receiving, from a user equipment, at least one of a number of supported receive and transmit panels that can be simultaneously activated and a panel switch time, and computing a UE-based latency lag using the number of supported receiver and transmitter panels that can be simultaneously activated and the panel switch time.

In a variant, the receiving comprises receiving the number of supported receive and transmit panels that can be simultaneously activated and the panel switch time as fields in a capability information element for downlink positioning.

In a variant, the UE-based latency lag comprises a minimum latency that is calculated based at least in part on the number of supported receiver and transmitter panels that can be simultaneously activated and the panel switch time.

In a variant, the UE-based latency lag comprises a minimum latency introduced by the user equipment measurement process in order to scan all angular directions. In one variant, the UE-based latency lag may be calculated according to the following equation: $\text{lag\_UE} = T/N \cdot t_{sw}$, where T represents a total number of user equipment panels previously reported, N represents the number of supported receiver and transmitter panels that can be simultaneously activated, and $t_{sw}$ represents the panel switch time.

In a variant, the method may further include selecting a user equipment behaviour for mode switching between a first mode and a second mode based at least on the UE-based latency lag and a tolerable latency.

In a variant, the first mode comprises UE-based beam sweeping in which the user equipment determines how the receive beams should be swept within a measurement gap occasion, and the second mode comprises prioritization-based beam sweeping in which the user equipment prioritizes, during a measurement gap occasion, an indicated subset of receive beams. For example, the indicated subset of receive beams may be determined based on their likelihood of providing measurements having at least one of high reference signal received power (RSRP), high signal-to-noise ratio (SNR), and/or high probability of line of sight (LOS).

In a variant, the method may include transmitting at least one information relating to the mode selection to the user equipment. In a variant, the method may include receiving, from the user equipment, a positioning measurement report based on the mode selection.

In a variant, the method may include generating, using at least one of the UE-based latency lag and past or most recent positioning reference signals (PRS) reports from the user equipment, at least one of a list of priority carrier frequencies and a list of measurement gap lengths (MGL). In a variant, there may be a one-to-one mapping between the carrier frequencies and the measurement gap lengths (MGL).

In a variant, the method may include transmitting at least one of the list of priority carrier frequencies and the list of measurement gap length (MGL) in an assistance data message to the user equipment.

In a variant, the method may include transmitting at least one of the list of priority carrier frequencies and the list of measurement gap length (MGL) to a network node serving the user equipment to proactively schedule a measurement gap (MG).

An embodiment is directed to a method, which may include receiving, at a user equipment, a request from a location management entity for at least one of a number of supported receive and transmit panels that can be simultaneously activated and a panel switch time, and providing, to the location management entity, the at least one of the number of supported receive and transmit panels that can be simultaneously activated and the panel switch time.

An embodiment is directed to an apparatus including at least one processor and at least one memory comprising computer program code. The at least one memory and computer program code are configured, with the at least one processor, to cause the apparatus at least to receive a request from a location management entity for at least one of a number of supported receive and transmit panels that can be simultaneously activated and a panel switch time, and to provide, to the location management entity, the at least one of the number of supported receive and transmit panels that can be simultaneously activated and the panel switch time.

An embodiment may be directed to non-transitory computer readable medium comprising program instructions stored thereon for performing at least the following: receiving a request from a location management entity for at least one of a number of supported receive and transmit panels that can be simultaneously activated and a panel switch time, and providing, to the location management entity, the at least one of the number of supported receive and transmit panels that can be simultaneously activated and the panel switch time.

In a variant, the providing comprises providing the number of supported receive and transmit panels that can be simultaneously activated and the panel switch time in fields of a capability information element for downlink positioning.

In a variant, the method may further include receiving, from the location management entity, a beam sweeping mode to use, performing positioning measurements based on the beam sweeping mode, and transmitting the positioning measurements to the location management entity.

In a variant, the beam sweeping mode may include at least one of: a UE-based beam sweeping mode in which the user equipment determines how the receive beams should be swept within a measurement gap occasion, or a prioritization-based beam sweeping mode in which the user equipment prioritizes, during a measurement gap occasion, a subset of receive beams that are more likely to provide measurements having at least one of high reference signal received power (RSRP), high signal-to-noise ratio (SNR), and/or high probability of line of sight (LOS).

In a variant, the method may also include receiving positioning session requirements from the location management entity, determining a beam sweeping mode according to the positioning session requirements, performing positioning measurements based on the beam sweeping mode, and transmitting the positioning measurements to the location management entity.

In a variant, the method may include receiving, from the location management entity, at least one of a list of priority carrier frequencies and a list of measurement gap lengths (MGL). In a variant, there may be a one-to-one mapping between the carrier frequencies and the measurement gap lengths (MGL).

In a variant, the method may include selecting, using the at least one of the list of priority carrier frequencies and the list of measurement gap length (MGL), a subset of positioning reference signal (PRS) carriers to measure and associated measurement gap length (MGL) and selecting a receive beam subset to measure with using a most recent positioning reference signal (PRS) receive beam and the selected measurement gap length (MGL), and performing positioning reference signal (PRS) measurement and reporting an enhanced measurement report comprising the selected receive beam subset to the location management entity.

BRIEF DESCRIPTION OF THE DRAWINGS

For proper understanding of example embodiments, reference should be made to the accompanying drawings, wherein:

FIG. 2 illustrates an example information element, according to an embodiment;

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for enhancing or performing positioning measurements, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to positioning in 5G, which is one of the enablers for various verticals and use cases that 5G aims to support. For example, positioning is in fact the enabler of multiple applications, such as location-based services, industrial IoT and autonomous driving.

5G positioning has advantages over traditional positioning technologies involving satellite connectivity, since it allows for applications executed both indoors and outdoors; that is, 5G positioning extends the area where positioning is supported. This may be particularly important for scenarios such as factory automation or warehouse management, for example.

Radio access technology (RAT)-dependent positioning methods based on downlink (DL) and uplink (UL) signals developed by 3GPP standards, such as positioning reference signals (PRS)/sounding reference signals (SRS), have been extensively studied in LTE as well as NR. 3GPP Release-17 may specify enhancements to positioning with more stringent requirements, e.g., to meet certain exemplary performance targets. For instance, for general commercial use cases, sub-meter level positioning accuracy of <1 m; and for IIoT use cases, positioning accuracy of <0.2 m. The target latency requirement is <100 ms and, for some IIoT use cases, latency of 10 ms is preferred.

Therefore, positioning in 3GPP targets improvement in terms of accuracy, latency, as well as integrity, thereby accounting for applications with diverse requirements. As a result, flexible positioning protocols may be needed to ensure that requirements are met with a proper resource allocation.

In DL positioning, for UE-assisted positioning, the measurement process is carried out by means of measurements at the UE side, which are reported to the network for location calculation. Similarly, for UE-based positioning, the same or similar measurements may be used locally at the UE side for location calculations. In case measurements across different frequencies are needed (so-called inter-frequency (IF) measurements), the measurements are executed following configuration from the gNB on so-called IF measurement gaps. Measurement gaps are designed to allow the UE to switch carrier frequencies, perform measurements on the new carrier, and then come back to the serving cell carrier. Measurement gaps may be configured by the serving gNB, corresponding to a duration of maximum 6 ms and a periodicity that varies between 20 ms and 120 ms.

It is noted that, as beamforming has to be used at higher frequency, if the existing specifications are applied to frequency range 2 (FR2) and beyond 52.6 GHz, the UEs would need to switch multiple panels/beams (at least two) to cover their entire angular space via beam sweeping. This would cause a problem when low-latency positioning is needed, since measurements in the two or more UE reception (Rx) directions might not be carried out simultaneously (e.g., depending on the stringency of limitations on the UE), and panel/beam switching introduces further processing delays (e.g., in the order of ms). Such UE measurement limitations stem from the typical commercial radio frequency (RF) architecture, where only 1 RF chain is used to serve all panels for operations beyond 52.6 GHz in order to keep the device cost low. Hence, only one panel is expected to be active at a time.

The positioning accuracy may depend on a UE's capability to conduct measurements across a wide angular range, hence restricting the measurements' angular space because of latency limitations results in decreased levels of accuracy. These sequential measurements may be needed at the UE side and, consequently, a more flexible IF measurement procedure is desirable so that the latency versus accuracy may be finely controlled by the location management function (LMF). It is noted that the latency on the measurements conducted by the UE in DL positioning has been acknowledged as the main latency component in the end-to-end latency analysis for Release-17 positioning. Hence, the problem of reducing the latency on measurements for positioning is important for reducing the end-to-end latency of a positioning session.

As will be discussed in detail below, certain example embodiments are configured to cover this gap in existing specifications by providing a new measurement gap framework and respective new LPP signalling exchange between a UE and LMF. For example, in an embodiment, following configuration from LMF, the UE is able to optimize its measurement collection on the basis of the latency requirements of a given session.

Certain example embodiments may provide one or more novel LPP messages that enable a LMF to control the latency versus accuracy of a target UE. For instance, some embodiments may provide two complementary methods. A first method is targeted at controlling the way the UE performs positioning measurements and, in particular, how flexible the beamed IF measurement is. For example, an embodiment may provide a framework through which the LMF decides and requires from the UE to switch between multiple measurement modes within a measurement gap (MG) occasion. For instance, depending on whether there is a low latency requirement for the positioning session, the LMF may instruct the UE to prioritize (or not) a certain set of RX beam directions.

A second method is targeted at dimensioning a flexible, UE-specific measurement gap length (MGL) to comply with the latency and accuracy requirements for each specific UE while supporting IF operations. Thus, in an embodiment, a more flexible MGL allocation and a carrier frequency prioritization are provided, thereby allowing the LMF to instruct the UE on flexible measurements, hence avoiding unnecessary exhaustive frequency-spectrum and full beam-sweeping by the target UE.

According to certain embodiments, one or both methods may include a LMF computing a UE-specific delay figure, i.e., the delay associated with the beam switching and processing at the UE side. Upon collection of the relevant metrics, the LMF may decide upon a strategy to meet the target latency requirement, as will be discussed in more detail below. For example, in some embodiments, a LMF may collect relevant metrics via a new LPP message and determine a UE-based lag to be used in deciding upon the strategy for meeting the target latency requirement.

Figure 1:
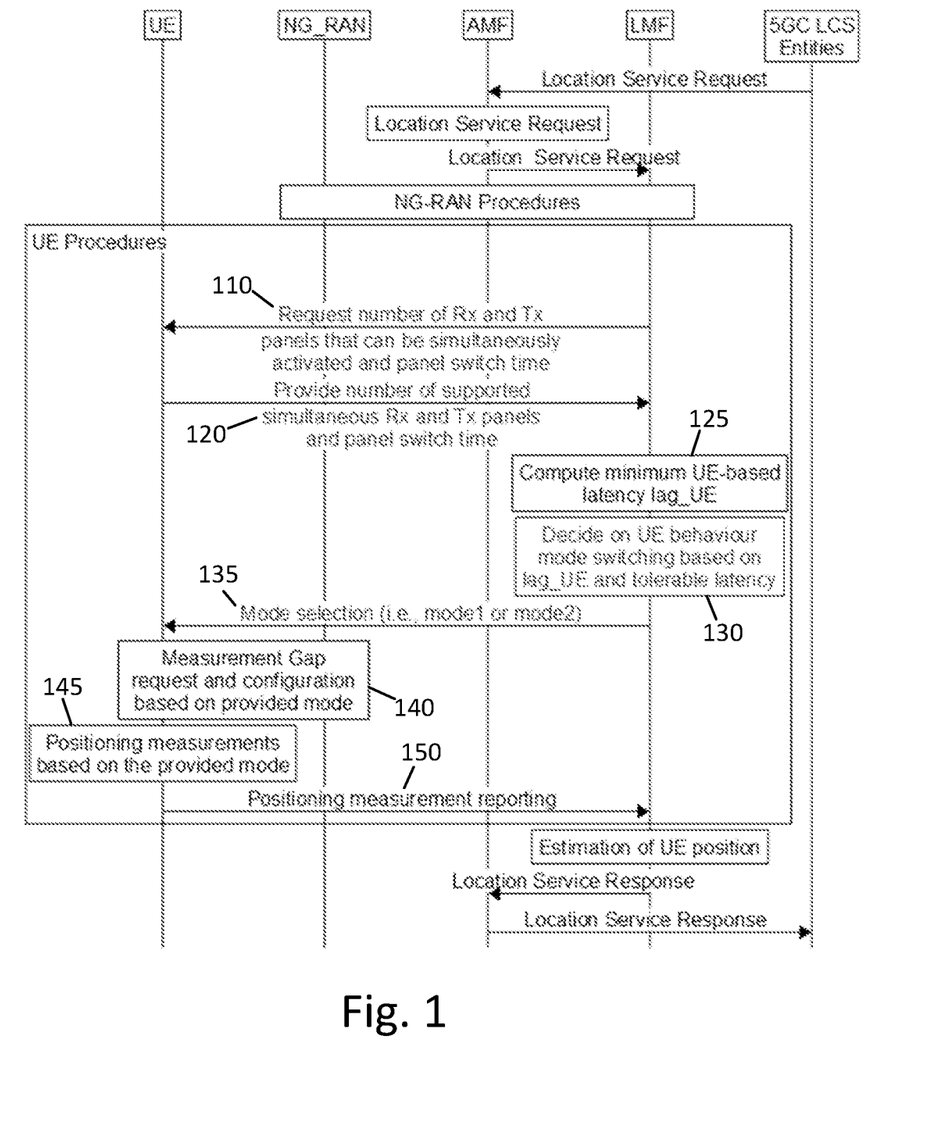
FIG. 1 illustrates an example signaling diagram, according to an embodiment.

As introduced above, one embodiment may provide a set of enhancements to the LPP protocol that enable the LMF to control the latency associated with UE processing by enforcing a required operating mode at the UE side. FIG. 1 illustrates an example signaling flow diagram, according to this embodiment. As depicted in the example of FIG. 1, the signaling flow diagram may include a UE, NG-RAN, access management function (AMF), LMF, and one or more 5G core (5GC) location services (LCS) entities.

As illustrated in the example of FIG. 1, at 110, the LMF may transmit a request, to the UE, for the number of Rx and Tx panels that can be simultaneously activated and panel switch time. In response, at 120, the UE may provide, to the LMF, the number of supported simultaneous Rx and Tx panels and the panel switch time. Thus, to compute the UE-based latency, the LMF obtains from the target UE at least the following: number of Rx and Tx panels that can be activated simultaneously (N), and/or the panel switch time (t_sw). In an example embodiment, the indication of the number of Rx and Tx panels that can be activated simultaneously (N), and/or the panel switch time (t_sw) may be included in an information element (IE) associated with a DL positioning method. For example, in one embodiment, the indication of the number of Rx and Tx panels that can be activated simultaneously (N), and/or the panel switch time (t_sw) may be included in the observed time difference of arrival (OTDOA) Provide Capabilities IE ("IE OTDOA-ProvideCapabilities"), as described in more detail below. In another example embodiment, the indication may be included a DL-angle of departure (AoD) IE. It should be noted that example embodiments are not merely limited to use of the OTDOA provide capabilities IE or an AoD IE, as example embodiments can be applied in any DL positioning method.

As further illustrated in the example of FIG. 1, at 125, the LMF may use the information received from the UE to compute a minimum UE-based latency as, e.g., lag_UE=T/N*t_sw (where T is the total number of UE panels already reported to the LMF) defined as the minimum latency introduced by the UE measurement process in order to scan all angular directions. As shown in the example of FIG. 1, at 130, using the computed minimum UE-based latency, lag_UE, and the required latency figures (obtained from the consumer of the UE positioning request), the LMF may decide on a UE behaviour mode switching, favouring either high accuracy or low latency. For example, in some embodiments, the LMF may decide between a mode 1 of UE-based beam sweeping and a mode 2 of prioritization-based beam sweeping.

In the UE-based beam sweeping (mode 1), the UE may determine how the Rx beams should be swept within a MG occasion based on its implementation. Thus, under mode 1, the network does not provide any implication about how the beam sweeping should be conducted at the UE-side. This mode 1 allows the UE to "explore" additional/finer beam directions that may eventually lead to better positioning accuracy.

In the prioritization-based beam sweeping (mode 2), during a MG occasion the UE may prioritize a subset of Rx beams that are more likely to provide favorable measurements (the subset could be determined based on, e.g., historical data or pre-configured by the network), to increase the probability that the UE can report measurements that are more likely to be useful quickly. For example, favorable measurements may include those with high reference signal received power (RSRP), high signal-to-noise ratio (SNR), and/or high probability of line of sight (LOS). In this context, high RSRP, high SNR, and/or high probability LOS may respectively include a RSRP, SNR, and/or LOS probability that are above a certain threshold, e.g., either provided by the network or chosen internally. For example, a high RSRP may be an RSRP value above −50 dBm. Similarly, high SNR may be anything above, for example 5 dB, and high LOS may refer to anything above, for example 0.55. Additionally, for instance, measurements that are likely to be useful may include measurements that increase the accuracy of the position estimates. For example, measurements of signals obtained in good LOS or low noise are more reliable than others.

It is noted that, in certain embodiments, the mode may be specified to avoid improper UE implementation in order to facilitate fulfilment of positioning requirements (e.g., latency). The UE is informed about the various modes via the assistance data at the start of the positioning session.

As illustrated in the example of FIG. 1, at 135, the LMF may transmit, to the UE, the mode selection, i.e., mode 1 or mode 2. Alternatively, the LMF may provide the requirements of the positioning session to the UE, and the UE can determine the beam sweeping mode by itself. Thus, instead of providing an explicit instruction at 135, the LMF may allow the UE to determine the mode on its own.

In the example of FIG. 1, at 140, the UE may communicate with the NG-RAN, e.g., a gNB, via RRC and trigger the processing corresponding to the required mode and, at 145, may perform positioning measurements according to the provided mode. Then, at 150, the UE may perform positioning measurement reporting to the LMF, and the LMF may perform estimation of the UE position based on the positioning measurement reporting.

As described above, FIG. 1 is provided as one example. Other examples are possible, according to some embodiments.

In certain embodiments, when a UE provides to the LMF via LPP information on UE-based figures, such as the number of Tx and Rx panels which can be activated simultaneously and panel switch time, at the beginning of the positioning session, new fields may be added to the "IE OTDOA-ProvideCapabilities" message. It is noted that the IE OTDOA-ProvideCapabilities is used by the target device to indicate its capability to support OTDOA and to provide its OTDOA positioning capabilities to the location server. FIG. 2 illustrates an example of this IE OTDOA-ProvideCapabilities, according to one embodiment. As depicted in the example of FIG. 2, the IE OTDOA-ProvideCapabilities may include a new "maxsupportedSimutaneousTxRxantennas" field 205 that may be used to indicate the maximum number of Tx and Rx panels that can be activated simultaneously, and a new "antennaSwitchTime" field 210 that may be used to indicate the panel switch time.

As described above, FIG. 2 is provided as one example IE. Other examples are possible, according to some embodiments.

According to a further embodiment, a set of enhancements are provided to the LPP protocol that enable the LMF to control the latency associated with UE processing by flexible MGL dimensioning and carrier prioritization.

For example, to ensure that the UE is configured with a sufficiently long but not overly-dimensioned MGL, a UE-based latency may be computed. To that end, several UE-based figures may be provided to the LMF by the UE itself, e.g., at the start of the positioning session, and/or by the serving gNB, if this information has been communicated in the past to the gNB. Therefore, according to an embodiment, the target UE may indicate to the LMF at least the following: the number of Rx and Tx panels that can be activated simultaneously N, and/or the panel switch time t_sw. In one example, the number of Rx and Tx panels and/or the panel switch time may be included in the IE OTDOA-ProvideCapabilities message, as described above.

According to an embodiment, the LMF may use the above to compute a minimum UE-based latency as, e.g., lag_UE=T/N*t_sw (where T is the total number of UE panels previously reported to the LMF) defined as the minimum latency introduced by the UE measurement process in order to scan all angular directions.

Next, in one embodiment, using at least the lag_UE and the past and/or most recent UE PRS reports, the LMF may generate a list of priority carrier frequencies and/or a list of MGL. For example, the LMF may generate a list of priority carrier frequencies, f_c_prio={fc1, . . . fcK}, containing the carrier frequencies of the PRS signals that are deemed to be most useful by the LMF. Here, the PRS transmissions for which one or more of the criteria apply may be designated as: 1. Low geometric dilution of precision (GDOP), 2. High reported RSRP, 3. High accuracy of past location estimates, etc. Additionally or alternatively, the LMF may generate a list of MGL, mgl_prio={mgl1, . . . , mglK}, with entries mapping one to one the carriers in f_c_prio, i.e., where mglk is the MGL for measuring PRS sent on fck. Thus, example embodiments, are configured to define a new LPP LMF message containing f_c_prio, mgl_prio, obtained using the above information.

Subsequently, in an embodiment, the LMF may append f_c_prio, mgl_prio to an enhanced assistance data message for the target UE. Additionally, the LMF may send the list pair to the serving gNB, e.g., for the gNB to proactively schedule the MG.

According to certain embodiments, with the above message and information collected during past PRS measurement, e.g., the best past PRS RX beams, rx_beam_prio, the UE may select a subset of: (i) PRS carriers to measure, i.e., f_c_subset∈f_c_prio and the associated MGL, mgl_subset, and (ii) RX beam subset to measure with, i.e., rx_beam_subset∈rx_beam_prio, by using the most recent rx_beam_prio and the selected mgl_subset.

Then, according to an embodiment, the target UE may perform PRS measurement and report an enhanced report containing in addition the rx_beam_subset. The best RX beams may be subsequently used by the LMF to refine f_c_prio, mgl_prio for future positioning requests in DL, or to schedule the SRS transmission in UL or dedicated SRS for positioning in UL.

In an embodiment, a method for a LMF to generate f_c_prio, mgl_prio is provided. The generation of f_c_prio and mgl_prio using at least lag_UE may be LMF implementation specific. However, for illustrative purposes, the LMF may use lag_UE and any of the historical reports and test whether a carrier fc(k) can be added to the set f_c_prio. In one example, the LMF may perform the following checks: 1. If RSRP(PRS(fc(k)))>threshold_R then move to 2. Note that threshold_R is an LMF selected threshold; 2. If GDOP{PRS(fc(k)), PRS(f_c_prio(j))}<threshold_G then move to 3; 3. Compute current latency C=lag_UE*Card{f_c_prio}; and 4. If C<=total_latency-lag_UE then add fc(k) to the list f_c_prio. It is noted that Card{f_c_prio} returns the length of the vector f_c_prio.

Then, once the list of frequencies f_c_prio is obtained, the MG associated with each carrier may be returned in the list mgl_prio. This means that mgl_prio(k) designates the MG for measuring carrier f_c_prio(k). The mapping mgl to fc may be typically tabulated and stored at the LMF.

According to an embodiment, for step (i) of selecting PRS to measure described above, the UE may evaluate each f_c_prio(k) against old measurements, e.g., check the past beamed RSRP: RSRP(PRS(f_c_prio(k)), t, rx_beam(z)), t<current_time, and select the first K carriers for which it measured the strongest K signals. It is noted that the UE keeps track of the past RSRP beamed measurements for e.g. beam alignment purposes. It is further noted that RSRP(PRS (f_c_prio(k)), t, rx_beam(z)), is the RSRP of the PRS sent at time t, on carrier f_c_prio(k), and received with the UE beam rx_beam(z).

Once the UE has selected the configuration corresponding to detecting the strongest K signals, K>1, it adds f_c_prio(k) to the subset f_c_subset, rx_beam(z) to rx_beam_prio. Next, using the mapping mgl_prio to f_c_prio sent by the LMF, the UE may select the k-th entry in mgl_prio and add it to the mgl_subset.

Figure 3A:
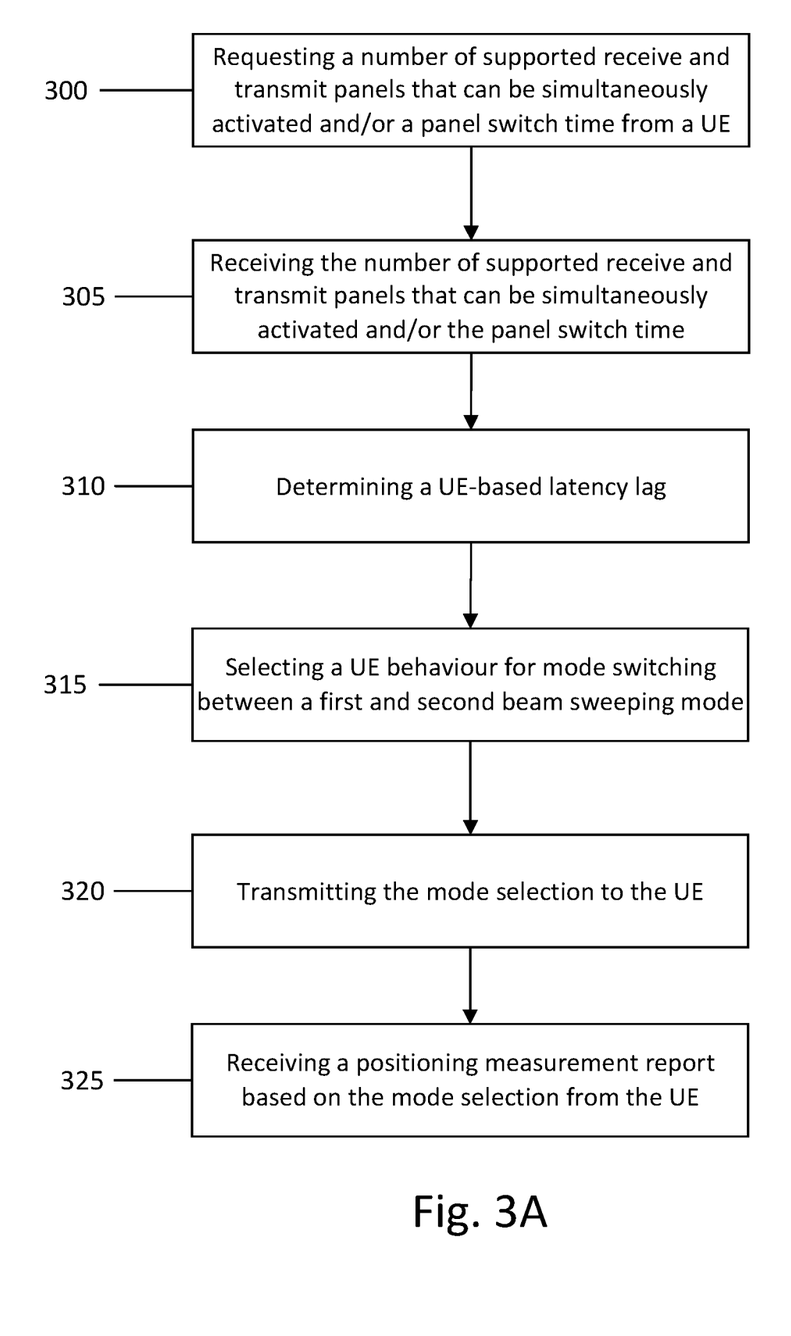
FIG. 3A illustrates an example flow diagram of a method, according to an embodiment.

FIG. 3A illustrates an example flow diagram of a method for performing or enhancing positioning measurements, according to one embodiment. For example, the method of FIG. 3A can optimize positioning measurements on the basis of the latency requirements of a given session. In certain example embodiments, the flow diagram of FIG. 3A may be performed by a network entity or network node in a communications system, such as LTE or 5G NR. In some example embodiments, the network entity performing the method of FIG. 3A may include or be included in a base station, access node, node B, eNB, gNB, NG-RAN node, transmission-reception points (TRPs), high altitude platform stations (HAPS), relay station or the like. In one embodiment, the network node performing the method of FIG. 3A may include a LMF or similar location management entity. As such, some of the operations illustrated in FIG. 3A may be similar to some operations shown in, and described with respect to the LMF in FIG. 1.

According to an embodiment, the method of FIG. 3A may optionally include, at 300, requesting a number (N) of supported receive and transmit panels that can be simultaneously activated and/or a panel switch time (t_sw) from a UE. In an embodiment, the method may include, at 305, receiving or obtaining, from the UE, the number (N) of supported receive and transmit panels that can be simultaneously activated and/or the panel switch time (t_sw). For example, the number of supported receive and transmit panels that can be simultaneously activated and/or the panel switch time may be received as fields in a provide capabilities IE for DL positioning, such as an OTDOA and/or AoD provide capabilities IE. In an embodiment, the method may include, at 310, computing or determining a UE-based latency lag (lag_UE) using the number (N) of supported receiver and transmitter panels that can be simultaneously activated and the panel switch time (t_sw). In certain embodiments, the UE-based latency lag (lag_UE) may refer to a minimum latency introduced by the UE measurement process in order to scan all angular directions, and the UE-based latency lag (lag_UE) may be calculated according to the following equation:

$$\text{lag\_UE} = T/N * t\_\text{sw},$$

where T represents a total number of user equipment panels previously reported, N represents the number of supported receiver and transmitter panels that can be simultaneously activated, and t_sw represents the panel switch time.

According to some embodiments, the method of FIG. 3A may include, at 315, selecting a UE behaviour for mode switching between a first mode and a second mode, e.g., favouring high accuracy or low latency, based at least on the determined UE-based latency lag and a tolerable latency as determined or indicated by the LMF. For example, the first mode may include a UE-based beam sweeping mode in which the UE determines how the receive beams should be swept within a measurement gap occasion, and the second mode may include prioritization-based beam sweeping mode in which the UE prioritizes, during a MG occasion, an indicated subset of receive beams. For example, the indicated subset of receive beams may be determined based on the likelihood that they provide favorable measurements, such as measurements having high RSRP, high SNR and/or high probability of LOS, as discussed above. In an embodiment, the UE may have been informed about the various modes via the assistance data at the start of the positioning session.

In an embodiment, the method of FIG. 3A may optionally include, at 320, transmitting at least one information relating to the mode selection to the UE and, at 325, receiving a positioning measurement report based on the mode selection from the UE. Although not illustrated in the example of FIG. 3A, according to another embodiment, rather than providing a mode selection to the UE, the method may include providing the positioning session requirements to the UE, which can then determine the beam sweeping mode according to the requirements.

Figure 3B:
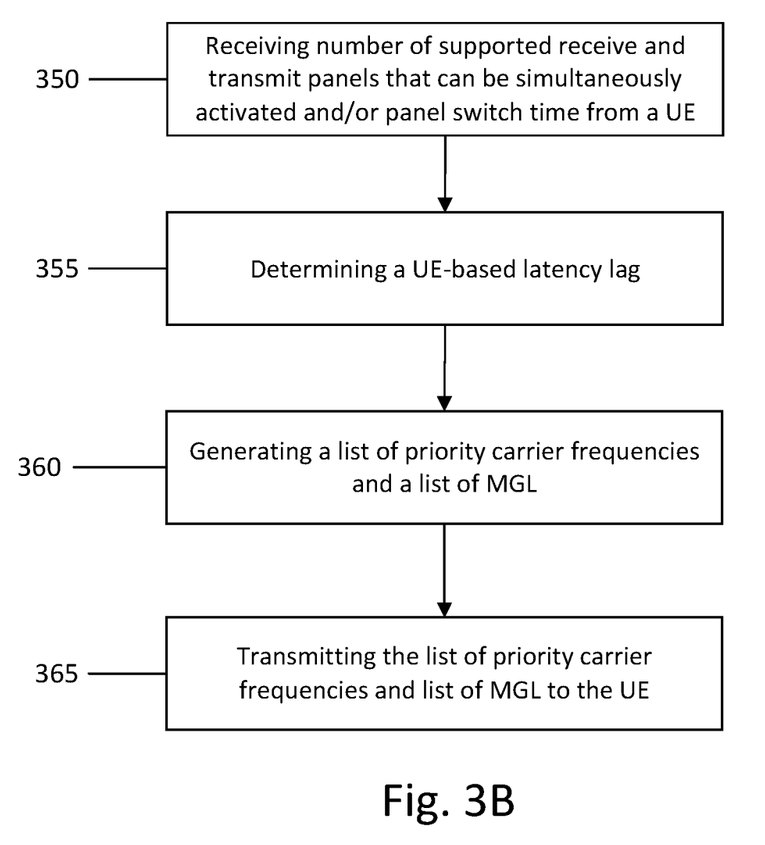
FIG. 3B illustrates an example flow diagram of a method, according to an embodiment.

FIG. 3B illustrates an example flow diagram of a method for performing or enhancing positioning measurements, according to another embodiment. For example, the method of FIG. 3B can optimize positioning measurements on the basis of the latency requirements of a given session. In certain example embodiments, the flow diagram of FIG. 3B may be performed by a network entity or network node in a communications system, such as LTE or 5G NR. In some example embodiments, the network entity performing the method of FIG. 3B may include or be included in a base station, access node, node B, eNB, gNB, NG-RAN node, transmission-reception points (TRPs), high altitude platform stations (HAPS), relay station or the like. In one embodiment, the network node performing the method of FIG. 3B may include a LMF or similar location management entity. As such, some of the operations illustrated in FIG. 3B may be similar to some operations shown in, and described with respect to the LMF in FIG. 1.

As illustrated in the example of FIG. 3B, the method may include, at 350, receiving or obtaining, from the UE, the number (N) of supported receive and transmit panels that can be simultaneously activated and/or the panel switch time (t_sw). For example, the number of supported receive and transmit panels that can be simultaneously activated and/or the panel switch time may be received as fields in a provide capabilities IE for DL positioning, such as an OTDOA and/or AoD provide capabilities IE. In an embodiment, the method may include, at 355, computing or determining a UE-based latency lag (lag_UE) using the number (N) of supported receiver and transmitter panels that can be simultaneously activated and the panel switch time (t_sw), e.g., as outlined in detail elsewhere herein. As further depicted in the example of FIG. 3B, the method may include, at 360, generating, using at least one the UE-based latency lag and past or most recent PRS reports from the UE, a list of priority carrier frequencies and a list of MGL. For instance, the generating 360 may include generating a list of priority carrier frequencies f_c_prio={fc1, . . . , fcK} containing the carrier frequencies of the PRS signals deemed to be most useful by the LMF. As an example, the PRS transmissions may be designated as useful based on which one or more of the following criteria apply: (1) Low GDOP, (2) High reported RSRP, or (3) High accuracy of past location estimates, etc. For example, the generating 360 may include generating a list of MGL mgl_prio={mgl1, . . . , mglK}, with entries mapping one to one the carriers in the list of priority carrier frequencies, f_c_prio (i.e., mglk is the MGL for measuring PRS sent on fck).

In certain embodiments, the method of FIG. 3B may include, at 365, transmitting the generated list of priority carrier frequencies and/or list of MGL, e.g., as part of an enhanced assistance data message, to the UE. Although not illustrated in the example of FIG. 3B, in some embodiments, the method may also include transmitting the generated list of priority carrier frequencies and/or list of MGL to a network node, such as a gNB, serving the UE so that the network node can proactively schedule a MG.

Figure 4A:
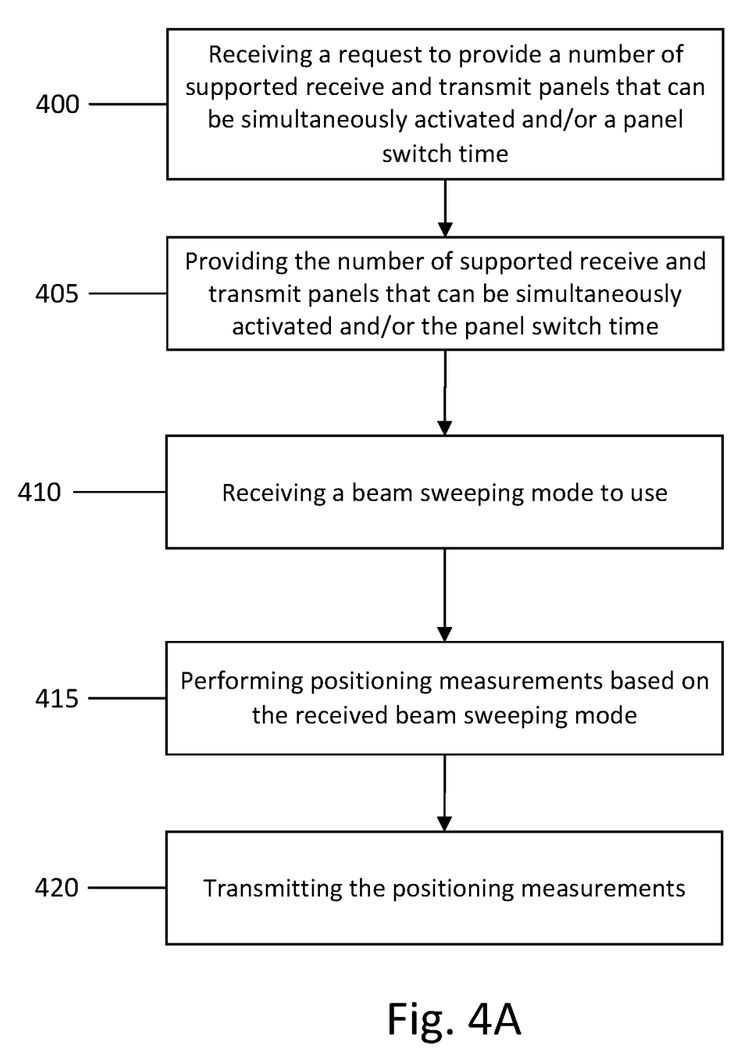
FIG. 4A illustrates an example flow diagram of a method, according to an embodiment.

FIG. 4A illustrates an example flow diagram of a method for performing or enhancing positioning measurements, according to one embodiment. In certain example embodiments, the flow diagram of FIG. 4A may be performed by a network entity or network node in a communications system, such as LTE or 5G NR. In some example embodiments, the network entity performing the method of FIG. 4A may include or be included in UE, communication node, mobile equipment (ME), mobile station, mobile device, stationary device, IoT device, or other device. As such, some of the operations illustrated in FIG. 4A may be similar to some operations shown in, and described with respect to the UE in FIG. 1.

As illustrated in the example of FIG. 4A, the method may include, at 400, receiving a request from a location management entity (e.g., LMF) to provide a number of supported receive and transmit panels that can be simultaneously activated and/or a panel switch time. The method may include, at 405, providing or transmitting, to the location management entity, the number of supported receive and transmit panels that can be simultaneously activated and/or the panel switch time. In an embodiment, the number of supported receive and transmit panels that can be simultaneously activated and/or the panel switch time may be provided in fields of a provide capabilities IE for DL positioning, such as those associated with OTDOA and/or AoD positioning methods.

According to certain embodiments, the method of FIG. 4A may include, at 410, receiving, from the location management entity, a beam sweeping mode to use at the UE. The method may then include, at 415, performing positioning measurements based on the received beam sweeping mode and, at 420, transmitting the positioning measurements to the location management entity. In another embodiment, rather than receiving the beam sweeping mode from the location management entity, the method may include receiving positioning session requirements from the location management entity and determining, at the UE, a beam sweeping mode according to the positioning session requirements. In this case, the method may include performing positioning measurements based on the determined beam sweeping mode and transmitting the positioning measurements to the location management entity. For example, the beam sweeping mode may include a UE-based beam sweeping mode in which the UE determines how the receive beams should be swept within a measurement gap occasion, and/or a prioritization-based beam sweeping mode in which the UE prioritizes, during a measurement gap occasion, a subset of receive beams that are more likely to provide favorable measurements.

Figure 4B:
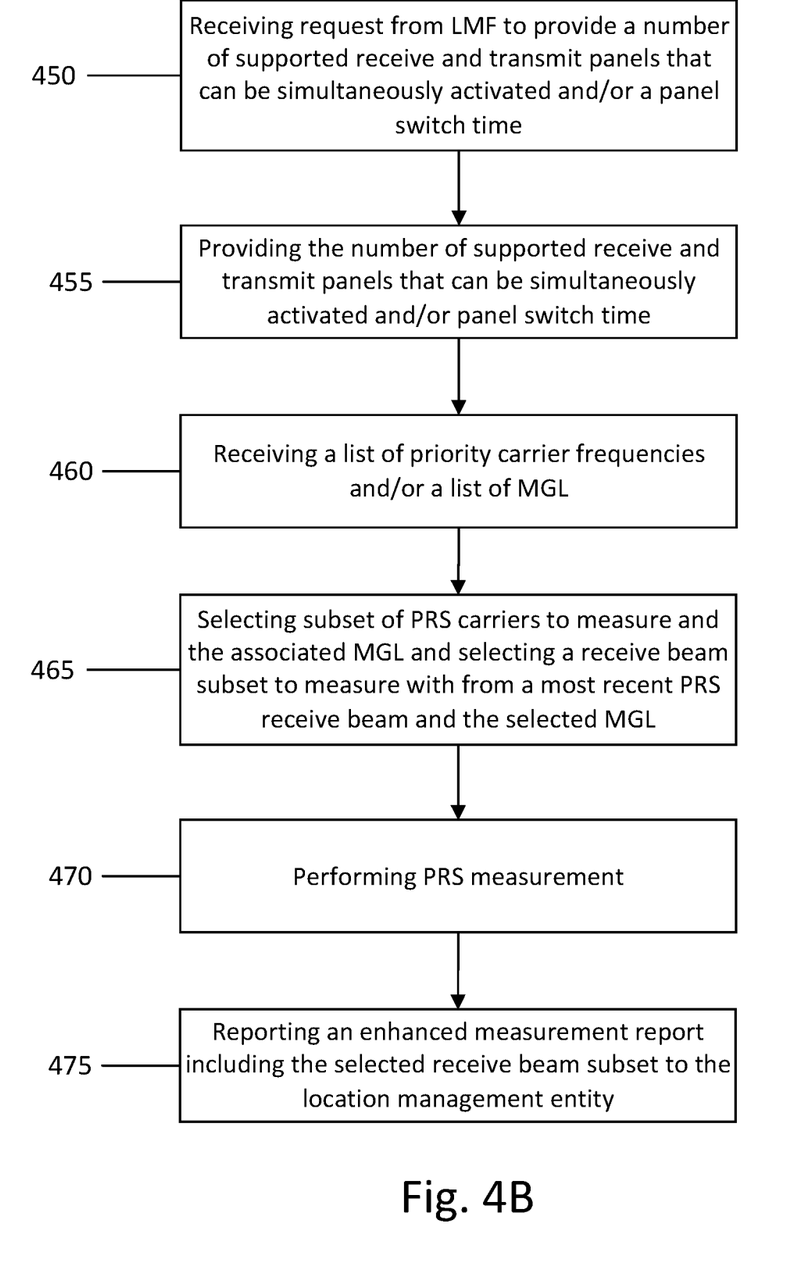
FIG. 4B illustrates an example flow diagram of a method, according to an embodiment.

FIG. 4B illustrates an example flow diagram of a method for performing or enhancing positioning measurements, according to one embodiment. In certain example embodiments, the flow diagram of FIG. 4B may be performed by a network entity or network node in a communications system, such as LTE or 5G NR. In some example embodiments, the network entity performing the method of FIG. 4B may include or be included in UE, communication node, mobile equipment (ME), mobile station, mobile device, stationary device, IoT device, or other device. As such, some of the operations illustrated in FIG. 4B may be similar to some operations shown in, and described with respect to the UE in FIG. 1.

As illustrated in the example of FIG. 4B, the method may include, at 450, receiving a request from a location management entity (e.g., LMF) to provide a number of supported receive and transmit panels that can be simultaneously activated and/or a panel switch time. The method may include, at 455, providing or transmitting, to the location management entity, the number of supported receive and transmit panels that can be simultaneously activated and/or the panel switch time. In an embodiment, the number of supported receive and transmit panels that can be simultaneously activated and/or the panel switch time may be provided in fields of a provide capabilities IE for DL positioning, such as those associated with an OTDOA or AoD positioning methods.

As further illustrated in the example of FIG. 4B, the method may include, at 460, receiving, from the location management entity, a list of priority carrier frequencies (f_c_prio) and/or a list of MGL (mgl_prio), for example, in an enhanced assistance data message. In an embodiment, the method may then include, at 465, selecting, using the list of priority carrier frequencies (f_c_prio) and/or the list of MGL (mgl_prio), a subset of PRS carriers to measure (f_c_subset $\alpha$?? f_c_prio) and the associated MGL (mgl_subset) and selecting a receive beam subset to measure with from a most recent PRS receive beam (rx_beam_subset $\alpha$?? rx_beam_prio) and the selected MGL (mgl_subset). In an embodiment, the method may then include, at 470, performing PRS measurement and, at 475, reporting an enhanced measurement report including the selected receive beam subset (rx_beam_subset) to the location management entity, which can then refine f_c_prio, mgl_prio for future positioning requests in DL or schedule the SRS transmission in UL.

Figure 5A:
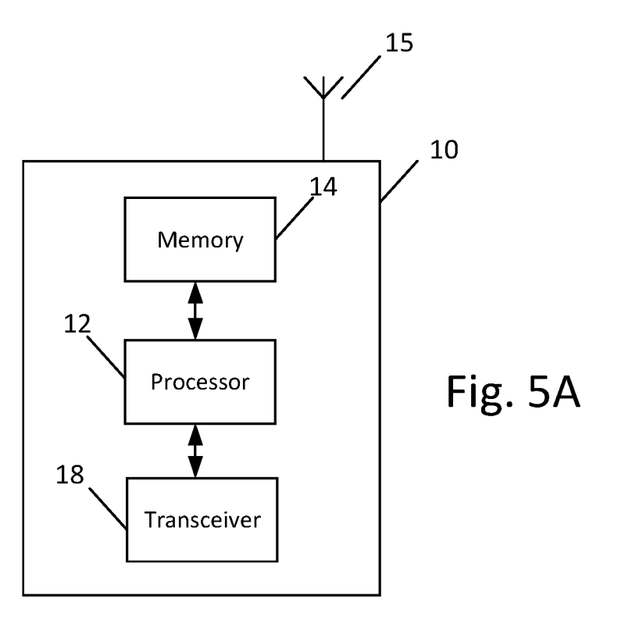
FIG. 5A illustrates an example block diagram of an apparatus, according to an embodiment.

FIG. 5A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be an LMF or location management entity, for instance.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5A.

As illustrated in the example of FIG. 5A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 5A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network element or RAN node, such as a base station, access point, Node B, eNB, gNB, TRP, HAPS, IAB node, WLAN access point, or the like. In one example embodiment, apparatus 10 may be a LMF or other location management entity. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as that illustrated in FIG. 1, 3A or 3B, or any other method described herein. In some embodiments, as discussed herein, apparatus 10 may be configured to perform a procedure relating to performing or enhancing positioning measurements, as discussed elsewhere herein, for example.

Figure 5B:
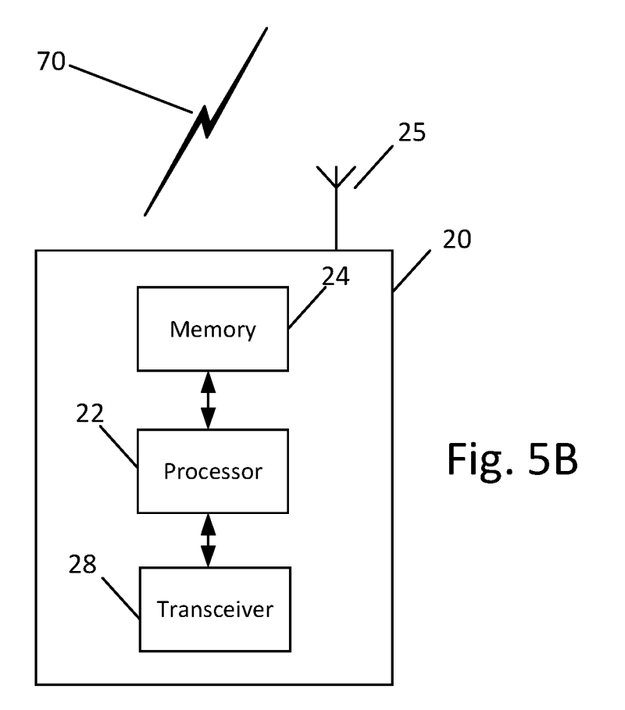
FIG. 5B illustrates an example block diagram of an apparatus, according to an embodiment.

FIG. 5B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5B.

As illustrated in the example of FIG. 5B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIG. 1, 4A or 4B, or any other method described herein. For example, in an embodiment, apparatus 20 may be controlled to perform a process relating to performing or enhancing positioning measurements, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and management. For example, as discussed in detail above, certain embodiments provide for flexible switching between low latency and high accuracy positioning, flexible LPP tailored to the UE RF-FE and PHY capabilities. Additionally, certain embodiments can reduce end-to-end latency of positioning session by limiting the time spent on measurements, which is the main latency component within a positioning session. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
   at least one processor; and
   at least one memory comprising computer program code, the at least one memory and computer program code are configured, with the at least one processor, to cause the apparatus at least to
   receive, from a user equipment, at least one of a number of supported receive and transmit panels that can be simultaneously activated and a panel switch time; and
   compute a UE-based latency lag using the number of supported receiver and transmitter panels that can be simultaneously activated and the panel switch time, wherein the at least one memory and computer program code are configured, with the at least one processor, to cause the apparatus at least to:
   select a user equipment behaviour for mode switching between a first mode and a second mode based at least on the UE-based latency lag and a tolerable latency; and
   transmit at least one information relating to the mode selection to the user equipment,
   wherein the first mode comprises UE-based beam sweeping in which the user equipment determines how the receive beams should be swept within a measurement gap occasion, and
   wherein the second mode comprises prioritization-based beam sweeping in which the user equipment prioritizes, during a measurement gap occasion, an indicated subset of receive beams.

2. The apparatus of claim 1, wherein the number of supported receive and transmit panels that can be simultaneously activated and the panel switch time are received in fields of a capability information element for downlink positioning.

3. The apparatus of claim 1, wherein the UE-based latency lag comprises a minimum latency that is calculated based at least in part on the number of supported receiver and transmitter panels that can be simultaneously activated and the panel switch time.

4. The apparatus of claim 1, wherein the UE-based latency lag comprises a minimum latency introduced by the user equipment measurement process in order to scan all angular directions, and is calculated according to the following equation:

$$\text{lag\_UE} = T/N * t\_sw,$$

where T represents a total number of user equipment panels previously reported, N represents the number of supported receiver and transmitter panels that can be simultaneously activated, and t_sw represents the panel switch time.

5. The apparatus of claim 1, wherein the indicated subset of receive beams is determined based on likelihood of providing measurements having at least one of high reference signal received power (RSRP), high signal-to-noise ratio (SNR), and/or high probability of line of sight (LOS).

6. The apparatus of claim 1, wherein the at least one memory and computer program code are configured, with the at least one processor, to cause the apparatus at least to receive, from the user equipment, a positioning measurement report based on the mode selection.

7. The apparatus of claim 1, wherein the at least one memory and computer program code are configured, with the at least one processor, to cause the apparatus at least to generate at least one of a list of priority carrier frequencies and a list of measurement gap lengths (MGL) using at least one of the UE-based latency lag and past or most recent positioning reference signals (PRS) reports from the user equipment.

8. The apparatus of claim 7, wherein there is a one-to-one mapping between the carrier frequencies and the measurement gap lengths (MGL).

9. The apparatus of claim 7, wherein the at least one memory and computer program code are configured, with the at least one processor, to cause the apparatus at least to transmit at least one of the list of priority carrier frequencies and the list of measurement gap lengths (MGL) in an assistance data message to the user equipment.

10. The apparatus of claim 7, wherein the at least one memory and computer program code are configured, with the at least one processor, to cause the apparatus at least to transmit at least one of the list of priority carrier frequencies and the list of measurement gap lengths (MGL) to a network node serving the user equipment to proactively schedule a measurement gap (MG).

11. A method, comprising:
   receiving, at a user equipment, a request from a location management entity for at least one of a number of supported receive and transmit panels that can be simultaneously activated and a panel switch time;
   providing, to the location management entity, the at least one of the number of supported receive and transmit panels that can be simultaneously activated and the panel switch time; and
   receiving at least one information relating to a mode selection between a first mode and a second mode, wherein the mode selection is based at least on a UE-based latency lag and a tolerable latency,
   wherein the first mode comprises UE-based beam sweeping in which the user equipment determines how the receive beams should be swept within a measurement gap occasion, and
   wherein the second mode comprises prioritization-based beam sweeping in which the user equipment prioritizes, during a measurement gap occasion, an indicated subset of receive beams.

12. An apparatus, comprising:
at least one processor; and
at least one memory comprising computer program code,
the at least one memory and computer program code are configured, with the at least one processor, to cause the apparatus at least to
receive a request from a location management entity for at least one of a number of supported receive and transmit panels that can be simultaneously activated and a panel switch time;
provide, to the location management entity, the at least one of the number of supported receive and transmit panels that can be simultaneously activated and the panel switch time; and
receive at least one information relating to a mode selection between a first mode and a second mode, wherein the mode selection is based at least on a UE-based latency lag and a tolerable latency,
wherein the first mode comprises UE-based beam sweeping in which the user equipment determines how the receive beams should be swept within a measurement gap occasion, and
wherein the second mode comprises prioritization-based beam sweeping in which the user equipment prioritizes, during a measurement gap occasion, an indicated subset of receive beams.

13. The apparatus of claim 12, wherein the number of supported receive and transmit panels that can be simultaneously activated and the panel switch time are provided in fields of a capability information element for downlink positioning.

14. The apparatus of claim 12, wherein the at least one memory and computer program code are configured, with the at least one processor, to cause the apparatus at least to:
receive, from the location management entity, a beam sweeping mode to use at the apparatus;
perform positioning measurements based on the beam sweeping mode; and
transmit the positioning measurements to the location management entity.

15. The apparatus of claim 14, wherein the beam sweeping mode comprises at least one of:
a UE-based beam sweeping mode in which the user equipment determines how the receive beams should be swept within a measurement gap occasion, or
a prioritization-based beam sweeping mode in which the user equipment prioritizes, during a measurement gap occasion, a subset of receive beams that are more likely to provide measurements having at least one of high reference signal received power (RSRP), high signal-to-noise ratio (SNR), and/or high probability of line of sight (LOS).

16. The apparatus of claim 12, wherein the at least one memory and computer program code are configured, with the at least one processor, to cause the apparatus at least to:
receive positioning session requirements from the location management entity;
determine a beam sweeping mode according to the positioning session requirements;
perform positioning measurements based on the beam sweeping mode; and
transmit the positioning measurements to the location management entity.

17. The apparatus of claim 12, wherein the at least one memory and computer program code are configured, with the at least one processor, to cause the apparatus at least to receive, from the location management entity, at least one of a list of priority carrier frequencies and a list of measurement gap lengths (MGL).

18. The apparatus of claim 17, wherein the at least one memory and computer program code are configured, with the at least one processor, to cause the apparatus at least to:
select, using the at least one of the list of priority carrier frequencies and the list of measurement gap length (MGL), a subset of positioning reference signal (PRS) carriers to measure and associated measurement gap length (MGL) and select a receive beam subset to measure with using a most recent positioning reference signal (PRS) receive beam and the selected measurement gap length (MGL);
perform positioning reference signal (PRS) measurement and reporting an enhanced measurement report comprising the selected receive beam subset to the location management entity.

* * * * *